(12) United States Patent
Turner et al.

(10) Patent No.: US 6,437,759 B1
(45) Date of Patent: Aug. 20, 2002

(54) VEHICLE SIMULATOR HAVING HEAD-UP DISPLAY

(75) Inventors: James A. Turner, Binghamton, NY (US); Ronald G. Hegg, Vista, CA (US)

(73) Assignee: L-3 Communications Corporation, New York, NY (US)

( * ) Notice: Subject to any disclaimer, the term of this patent is extended or adjusted under 35 U.S.C. 154(b) by 0 days.

(21) Appl. No.: 09/519,957

(22) Filed: Mar. 7, 2000

(51) Int. Cl.[7] .................................................. G09G 5/00
(52) U.S. Cl. .......................... 345/8; 348/115; 348/121; 434/44
(58) Field of Search ................... 345/1.1, 7–8; 340/980, 340/967, 974, 977; 359/630, 631; 348/113, 115, 117, 118, 121–124; 434/38–44

(56) References Cited

U.S. PATENT DOCUMENTS

| | | | |
|---|---|---|---|
| 3,936,148 A | | 2/1976 | Ellis |
| 4,652,870 A | | 3/1987 | Steward |
| 5,072,218 A | * | 12/1991 | Spero et al. ................ 340/980 |
| 5,320,534 A | * | 6/1994 | Thomas ........................ 434/44 |
| 5,430,505 A | * | 7/1995 | Katz ........................... 351/208 |
| 5,838,262 A | * | 11/1998 | Kershner et al. ........... 340/945 |
| 6,014,117 A | * | 1/2000 | Hennessy et al. .............. 345/8 |

* cited by examiner

Primary Examiner—Steven Saras
Assistant Examiner—Amr Awad
(74) Attorney, Agent, or Firm—Andrew L. Tiajoloff

(57) ABSTRACT

A vehicle simulator having a projection system for projecting a generated scene and symbology onto a common viewing screen. Tracking apparatus is provided for providing position and/or angular orientation signals representative of the eye of a person viewing the projected scene and symbology. An image generation system is included for generating the scene and symbology for the projection system, such scene and symbology being generated as a function of the position and/or angular orientation signals provided by the tracking apparatus. Such symbology is representative of symbology produced by a head-up display. The image generation system generates the scene and symbology with characteristics which simulate vignetting and/or occulting effect characteristics of the head-up display. The OTW scene and symbology are projected onto a screen and are co-located while the image generator, base or data of the eye position of the user, produces the symbology to simulate the collimation, vignetting and occulting effects of the HUD optical type used in the vehicle that is simulated.

35 Claims, 7 Drawing Sheets

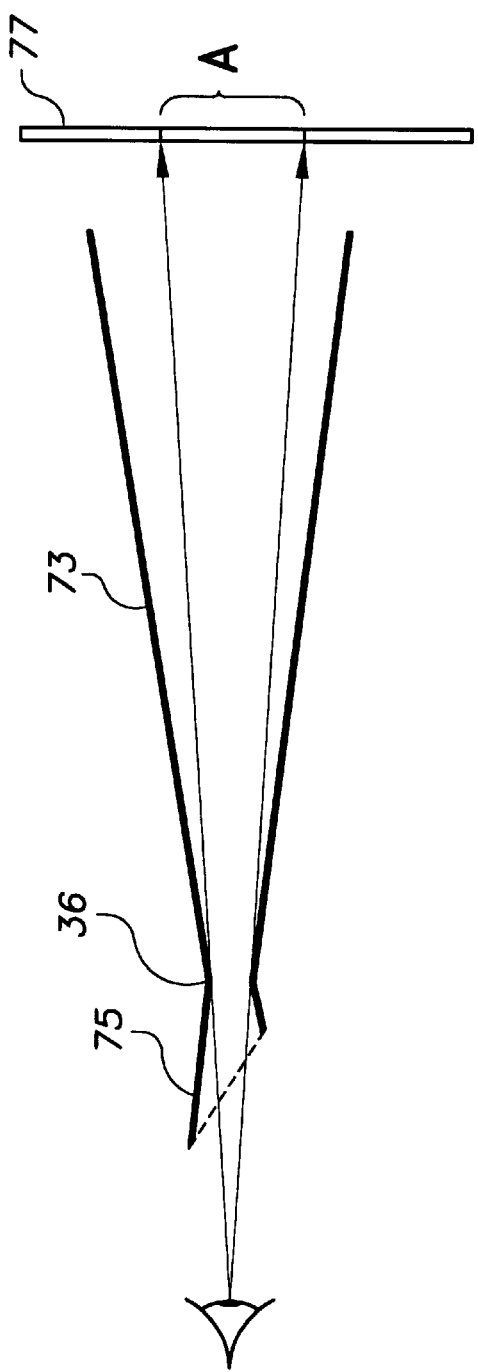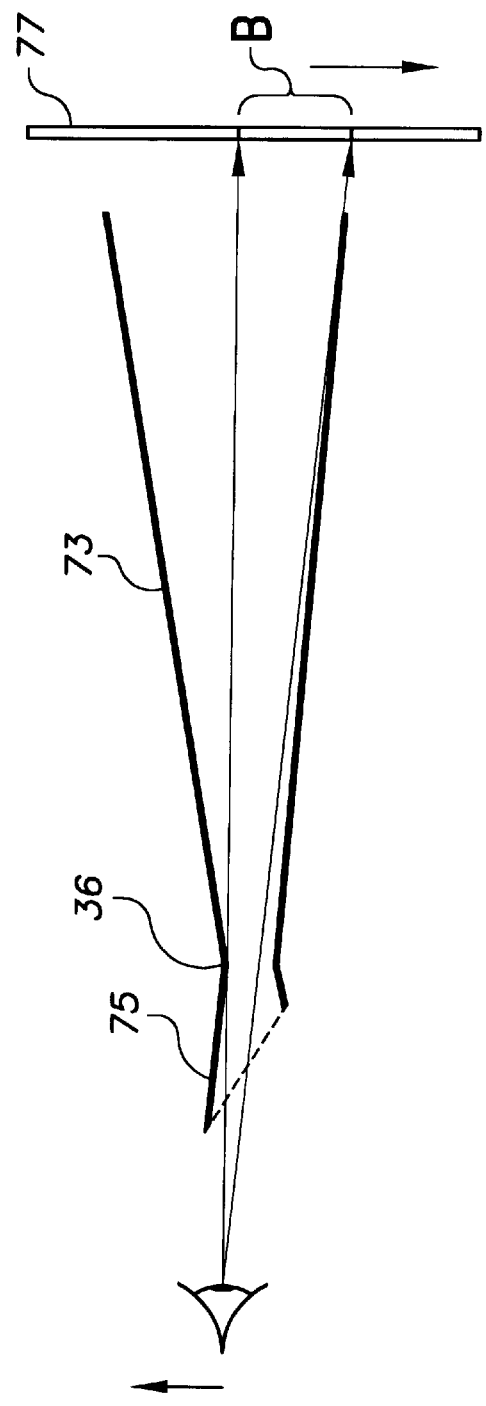

VEHICLE SIMULATOR HAVING HEAD-UP DISPLAY

BACKGROUND OF THE INVENTION

This invention relates generally to vehicle simulators and more particularly to vehicle simulators having head-up displays.

It is known in the art to use vehicle simulators, such as aircraft flight or tank simulators, to train operators of such vehicles.

With respect especially to aircraft flight simulators, many aircraft, particularly fighter aircraft, have head-up displays which enable a pilot to view the outside environment in front of the aircraft together with information which is typically displayed on an instrument panel of the aircraft. The head-up display enables the pilot to observe a scene outside the aircraft (i.e., an "out-the-window" (OTW) scene) and at the same time to see, i.e., in superposition with the OTW scene, information ("symbology"), which the pilot may need, such as altitude, speed, a pointer to a target, etc.

An example of one such head-up display (HUD) is shown in FIG. 1 wherein a head-up display (HUD) optical system 10 projects information provided on the HUD's display device, such as a cathode ray tube (CRT) 12, to the eye 14 of an observer through an optical system 16. The optical system 16 is used to collimate the images ("symbology"), e.g., alphanumeric characters, lines, target pointers, etc.) produced on the HUD display device 12. The collimated HUD images are then viewed in superposition with the OTW imagery through the beamsplitter 18.

The HUD system 10 in the aircraft shown in FIG. 1 is focused at infinity (i.e., collimated) because the OTW scene being observed by the pilot is also typically at "infinity". In the HUD system 10 shown in FIG. 1, if the pilot moves his head to the right, for example, not only does the target he is observing move to the right, but the symbology on the beamsplitter 18, such an example a pointer generated by the HUD 10 pointing to a target, also appears at the eye 14 to move to the right on the beamsplitter 18, thereby remaining on the target.

Referring to FIG. 2, a flight simulator 19 of the prior art is shown. The simulator 19 has the cockpit portion 21 of the aircraft, including has a HUD system 10. Simulator 19 includes a projector 24 driven by an image generator 26 to produce the simulated OTW scene, and the generated OTW scene is projected by the projector 24 onto a screen 28 for observation by the pilot being trained.

In the simulator, as in the real world, an acceptable superposition of the HUD and OTW imagery occurs when the two images are focused at the same distance. The screen 28, however, is not at infinity but relatively close to the eye 14 of the pilot, and consequently, the actual vehicle's HUD, which is focused at infinity for use in a real environment, cannot be used without modification.

One approach for making a HUD for such a simulator is to modify the optical system in the HUD 10 so that it focuses at the same distance from the eye 14 as the screen 28, i.e., such that the optical system 16 of the HUD 10 makes the symbology appear to the eye 14 as if it were located on the screen 28. The HUD optical system 16 must be modified so that a simulated, distant target being projected on the screen 28, and a symbology pointer (generated by the HUD 10) pointing to the target (which is generated on the OTW screen 28) appear co-located wherever the pilot in the simulator moves his head.

One problem with this design is that each different type of aircraft usually has a different HUD type, or multiple HUD types, and simulators for a given aircraft may use different displays forming images at differing distances from the user's eye. The optical system 16 for the HUD system 10 in the simulator 19 is a function of both the screen placement and the HUD type used in the simulator 19. A different optical system 16 must therefore be designed for each HUD type used with each different display having a different screen distance from the eye. Further, as refocusing requirements become shorter and shorter, to match decreased distances in the simulator's OTW display, it becomes more and more difficult to refocus the HUD optics while maintaining the actual HUDs FOV, vignetting characteristics, and mechanical packaging.

A technique to avoid this problem is to project the HUD symbology on the same screen on which the OTW scene is projected, as shown the simulator 19' of FIG. 3. Both the OTW projector 24, which projects the OTW scene, and a HUD projector 30, which projects the HUD symbology, appear on the same screen 28, and consequently, the OTW scene and the symbology are physically co-located.

However, referring again to FIG. 1, in an actual cockpit environment, the HUD system 10 provides the symbology on only a limited portion of the field of view available to the pilot. If the pilot moves his head around in an actual cockpit as in FIG. 1, portions or all of the symbology may or may not be visible to the pilot due to optical limitations of the HUD system, herein described as occulting or vignetting. The term "occulting" is meant to broadly describe any blocking or interruption in the visibility of the symbology, such as by structures of the cockpit or in the HUD optical system. The term "vignetting" refers to a type of occulting which is caused by movement of the viewer's eye beyond the optically functional portions of the lens system which is normally in the center of the lens or lenses. The occulting or vignetting is caused by a combination of things in the HUD optical system 10, i.e., the beamsplitter 18, the lenses and lens frames of the optics, and the CRT. For example, if the pilot's head is moved so that some of the HUD FOV falls outside of the beamsplitter coverage 18, that portion is no longer viewable by the pilot.

Consequently, in the arrangement shown in FIG. 3, while projection of the HUD generated symbology and the OTW scene onto a common screen 28 produces the desired co-location effect, the system does not simulate the vignetting or occulting characteristics associated with the real HUD being simulated. The prior art therefore fails to provide a realistic simulation of a vehicle heads up display.

SUMMARY OF THE INVENTION

It is therefore an object of the present invention to provide an improved head-up simulator that better simulates the real HUD system in an economical way.

In accordance with the present invention, a vehicle simulator is provided which includes a projection system for projecting a generated scene and symbology onto a common viewing screen. Tracking apparatus is provided for producing position and/or angular orientation signals representative of the position of the eye of a person viewing the projected scene and symbology on the common viewing screen. An image generation system is included for generating the scene and symbology for the projection system, the symbology being generated as a function of the position and/or angular orientation signals provided by the tracking apparatus.

The OTW scene and the symbology are projected onto a common screen and thus are co-located, while the image generator, using data indicative of the position of an eye of the person in the simulator, produces the symbology in a way which simulates the vignetting or occulting effect characteristic of the HUD optical type being simulated.

Other features of the invention will become more readily apparent from the detailed description, and the scope of the invention will be described by the claims.

BRIEF DESCRIPTION OF THE DRAWINGS

FIGS. 7 and 8 are cross section diagrams illustrating vignetting using the diagramed model of FIG. 6.

DESCRIPTION OF THE PREFERRED EMBODIMENTS

Figure 1:
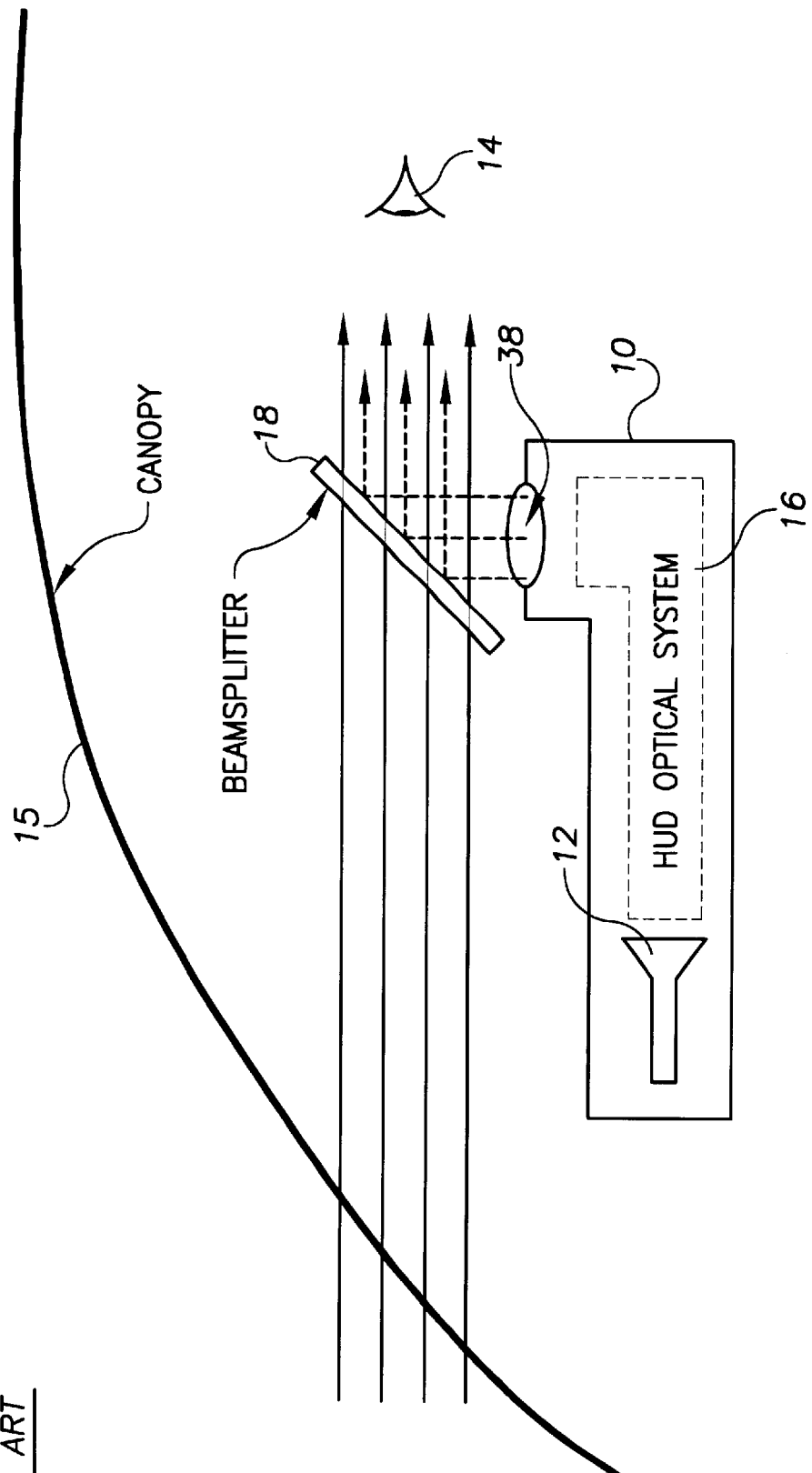
FIG. 1 is a schematic showing a cockpit portion of an aircraft having a HUD enabling a pilot to simultaneously view a scene outside the cockpit and symbology produced by the HUD according to the PRIOR ART.
Figure 2:
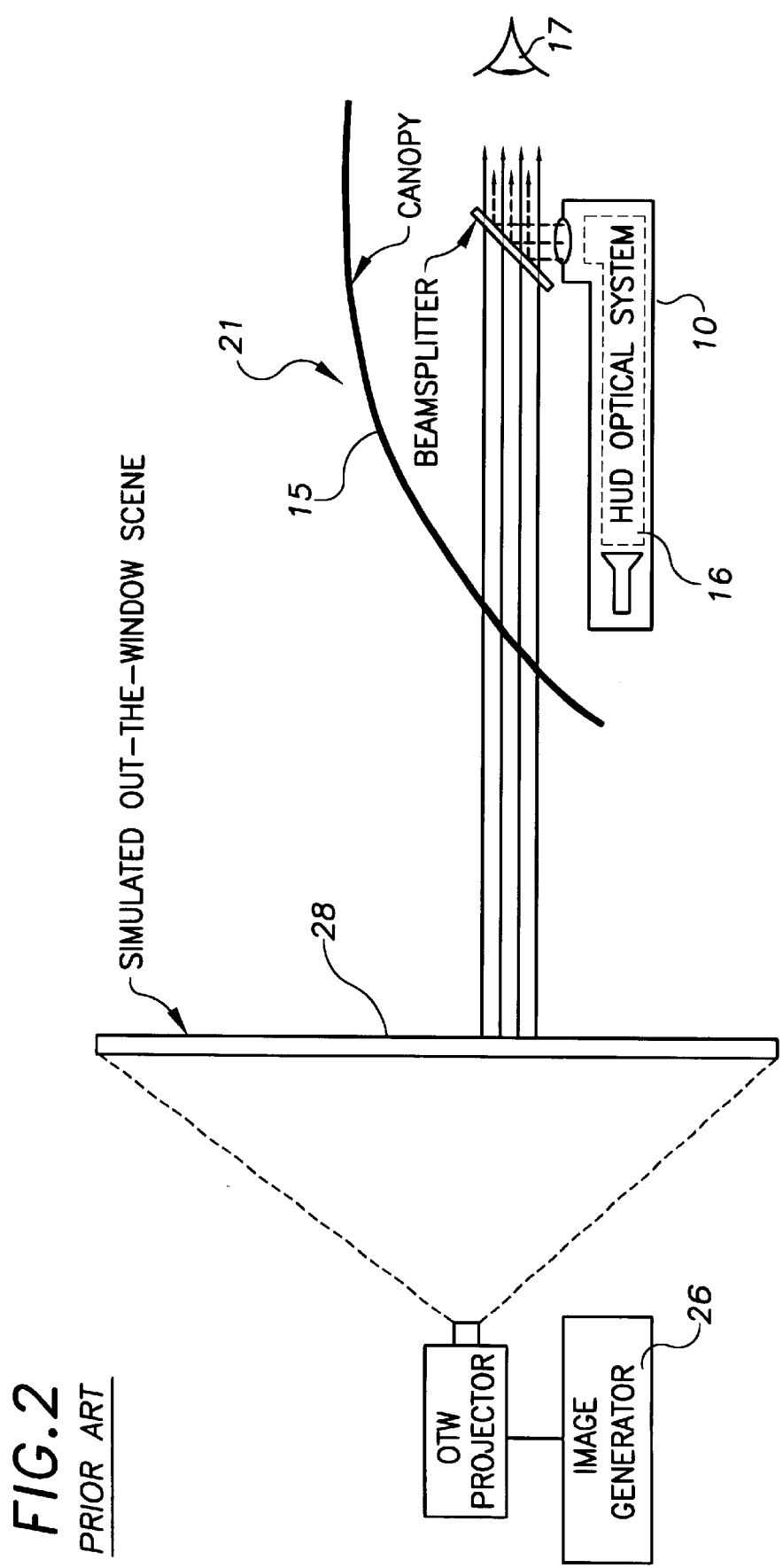
FIG. 2 is a schematic showing a simulator for training a pilot in use of the aircraft of FIG. 1 according to the PRIOR ART.
Figure 3:
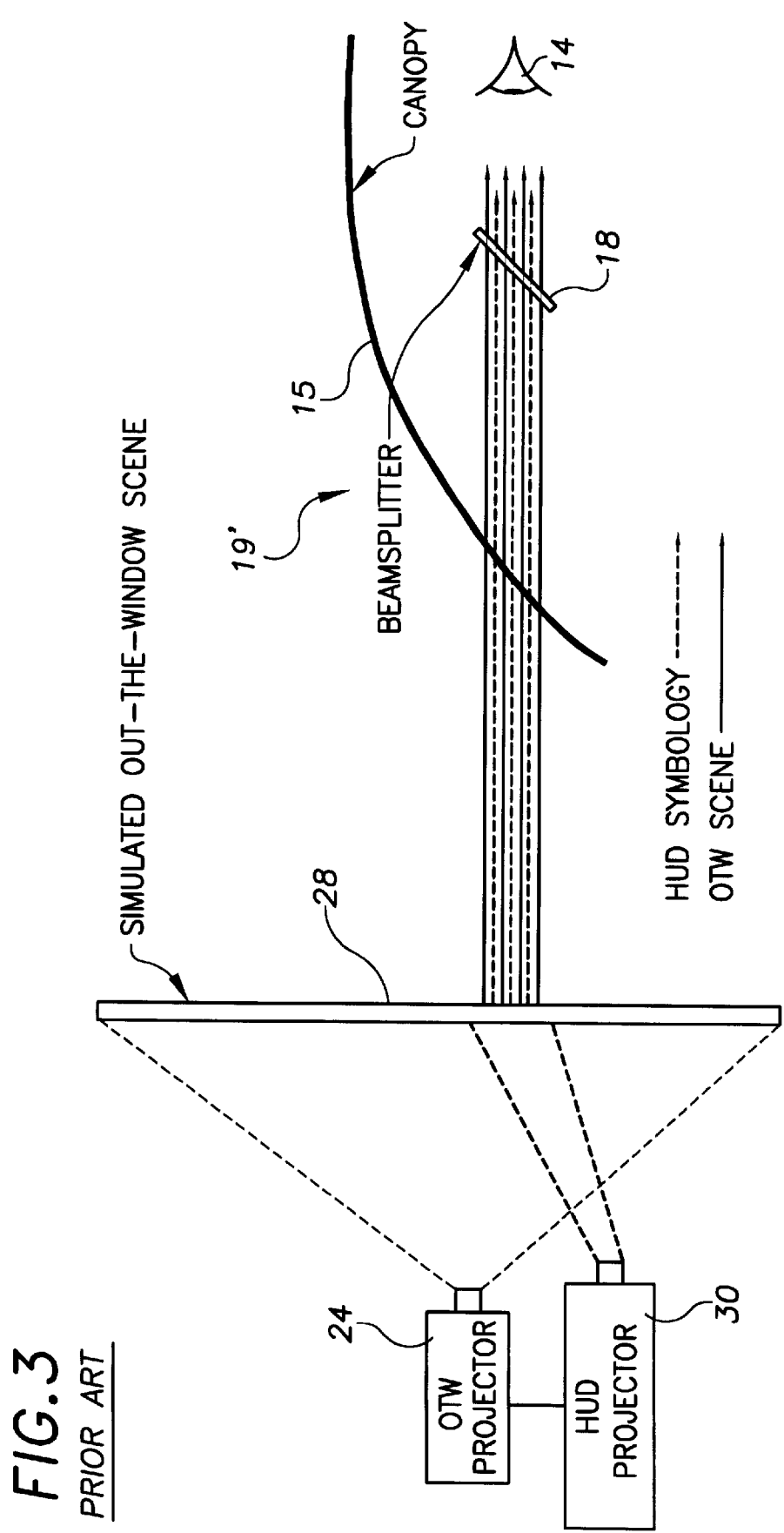
FIG. 3 is a schematic showing a simulator for training a pilot in use of the aircraft of FIG. 1 according to the PRIOR ART.
Figure 4:
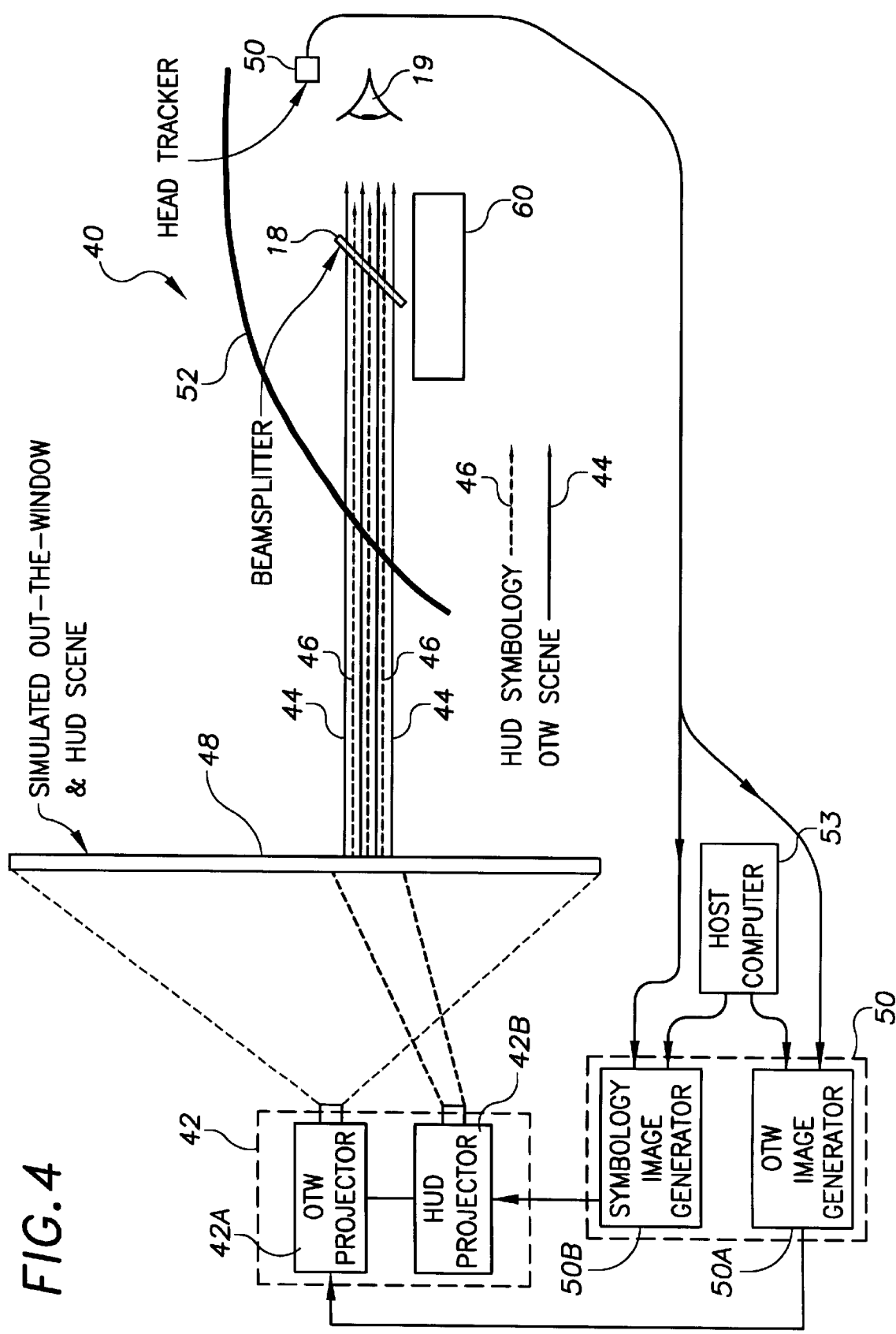
FIG. 4 is a schematic showing a flight simulator adapted to train a pilot in operation of the aircraft of FIG. 1 according to the invention.

Referring to FIG. 4, a vehicle simulator 40, here an aircraft flight simulator, is shown. The system 40 includes a projection system 42 for projecting a generated OTW scene (represented by solid arrow 44) and symbology (represented by the dotted arrow 46) onto a common viewing screen 48. Other methods of presenting images to the user may also be used, including a CRT display, an LCD display, various shaped screens with varying surfaces, viewed directly or through optical systems, or helmet-mounted displays. Tracking apparatus 50 is provided to give position and/or angular orientation signals representative of the position of the eye 19 of a person, here a pilot being trained in the simulator 10, and viewing the projected scene 44 and the symbology 46 on screen 48 through canopy 52.

The simulator of the preferred embodiment includes a host computer 53 which receives data from the simulator and processes the data to continually define the changing simulated situational environment, e.g., the background landscape, targets, and any other objects that exist in the simulated situation. The situational data is transmitted to an image generation system 50 for generating the OTW scene 44 and the symbology 46 for the projection system 12. The symbology 46 is generated as a function of the position and/or angular orientation signals provided by the tracking apparatus 50. The OTW scene 44 and the symbology 46 are projected onto the screen 14 and thus are co-located while the image generator 54, having data representing the position of at least one eye 19 of the person in the simulator 40, produces the symbology 46 in a way which incorporates the vignetting and occulting effect of the HUD optical type being simulated in the simulator 40.

Although potentially a single high resolution projector might be used in projector 42, in the preferred embodiment, the projection system 42 includes two separate projectors 42A, 42B. Projector 42A is used to provide the OTW scene 44 on the viewing screen 48 and projector 42B is used to provide the symbology 46 on the viewing screen 48 superimposed with the OTW scene 44.

Image generation system 50 generates the images for the OTW and HUD displays which are sent to the projectors 42A and 42B. Image generator 50 may be a single data processing system or even a part of the host computer, but most preferably comprises two image generators 50A and 50B each connected with a respective projector 42A or 42B. In the preferred embodiment, these generators are each specialized digital computer processing systems operating simultaneously in parallel. Image generator 50A is used to provide the signals representative of the desired OTW scene 44 to projector 42A and the image generator 50B is used to provide the symbology 15 for projector 42B.

The OTW scene 44 is the simulated scene viewed for the aircraft as it moves against a background in response to maneuvering signals produced in response to flight path signals generated by the pilot. The OTW scene 44 may include a number of targets, including ground targets, i.e., tanks, etc., and airborne targets, such as enemy aircraft. These OTW scenes 44 are generated in any conventional manner typically provided in a conventional flight simulator.

The symbology image generator 50B is, as noted above, linked with and responsive to tracking apparatus 50 which tracks the location of the head and/or at least one of the eyes of the trainee. Most preferably, other sensors may be used, but the tracking apparatus 50 is an apparatus using magnetic sensors or transducers carried on the head of the pilot, as in a helmet.

The symbology image generator 50B generates symbology images wherein the appropriate symbology is co-located with the relevant objects, and it also preferably includes a modeling process that alters the symbology image to conform to vignetting and occulting object(s) that would ordinarily vignette/occult the symbology in the real HUD system being simulated.

Figure 5:
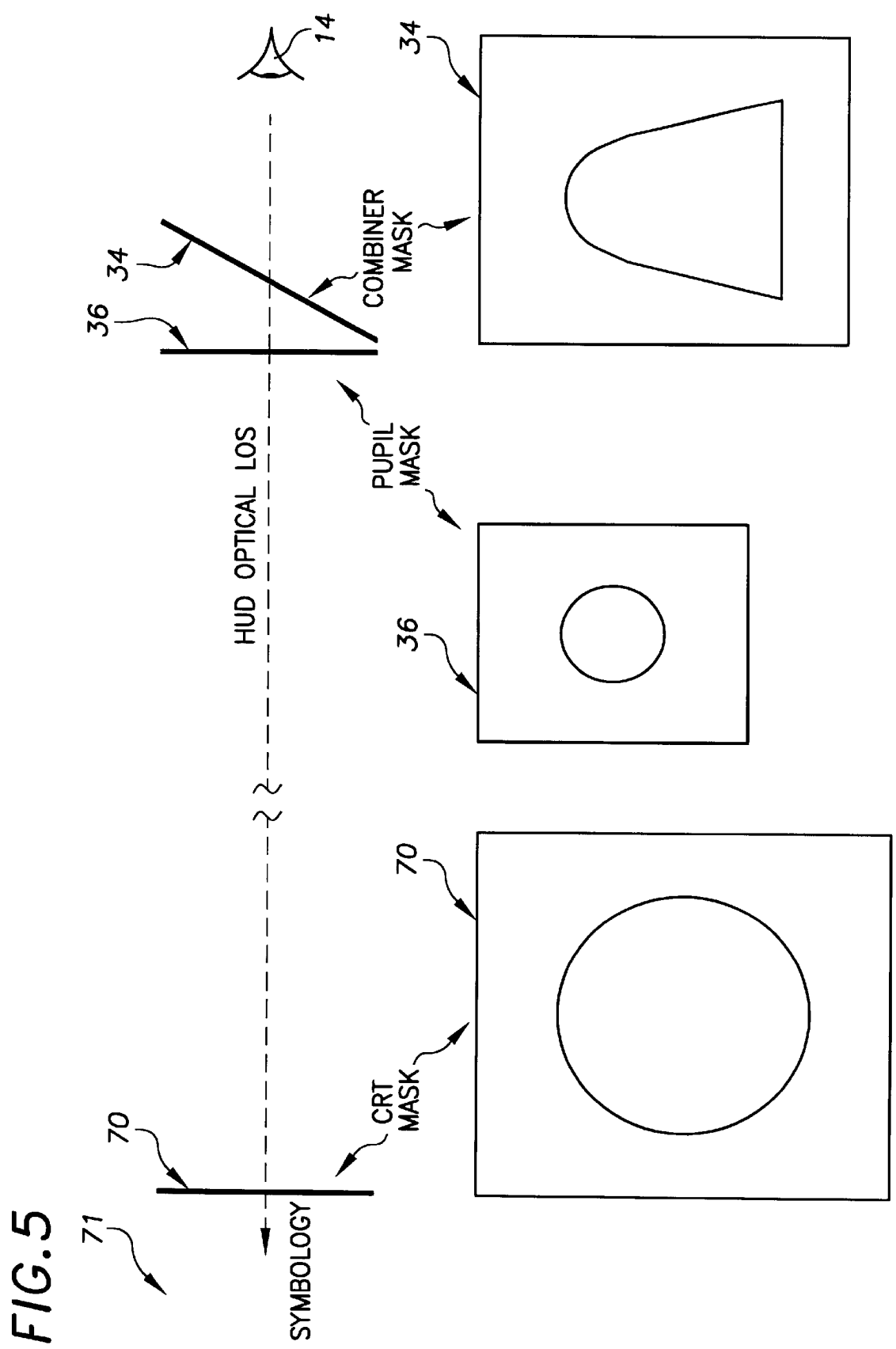
FIG. 5 is a diagram illustrating the use of image generation masks in simulating the vignetting and occulting characteristics of an actual HUD in a symbology image generator such as that shown in the simulator of FIG. 4.

FIG. 5 shows a possible set of such vignetting and occulting object(s) as would exist in a non-pupil forming HUD. The symbology image generator 50B preferably has means for modeling these masks therein, which is used to modify the symbology image to simulate their presence in th esimulated HUD. Alternatively, it is also possible to provide a separate occulting/vignetting system receiving the symbology image from the symbology image generator 50B and then modifying this symbology image based on a model of the masks or objects to be simulated, and on data indicative of the position of the eye of the user.

In a non-pupil forming model, the object(s) being modeled preferably consist of large opaque planar masks with appropriately sized and shaped cutouts matching the HUD's CRT limits 70, optical pupil(s) 36, and combiner 34, with the symbology drawn either beyond the CRT cutout or in such an order as to be occulted by the mask(s). This occultation is a function of the pilot's eye 19 position, most preferably represented by the pilot's head angular position and/or orientation relative to the position of a dummy HUD 60 in the aircraft simulator 40.

Figure 6:
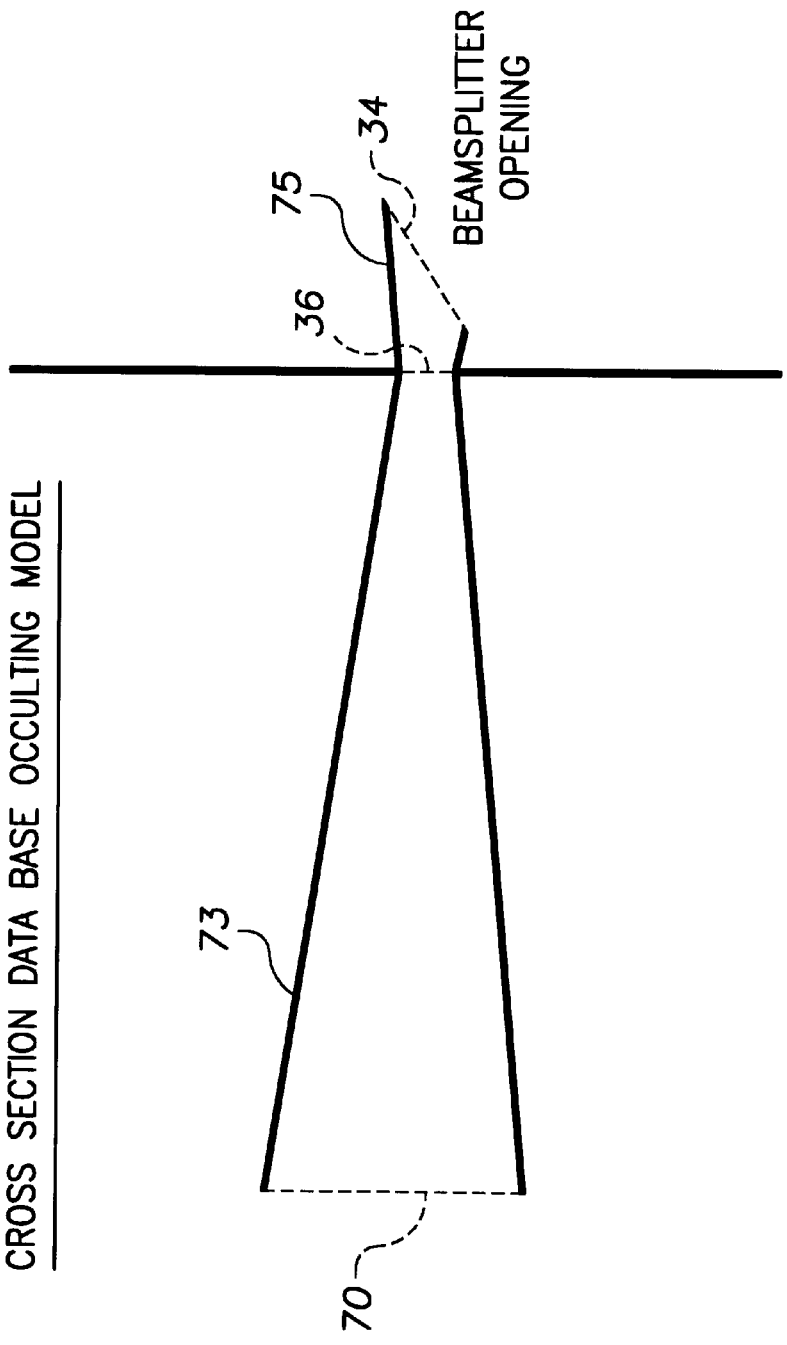
FIG. 6 is a diagram of the modeled cross section of the occulting masks for simulating the occlusion and vignetting effect caused by a non-pupil forming HUD in the simulator of FIG. 4.

The model of the occulting of the non-pupil forming HUD produces occulting of the symbology as would occur in an optical passage as shown in FIG. 6. The section 73 of the model for the CRT mask 70 to pupil 36 is generally a conic section. The section 75 from pupil 36 to combiner mask 34 is a more complex form linking the two shapes of the apertures thereof. The modeling based on this particular conceptual model also reduces requirements of the symbology image generator 50B as to pixel fill, as compared to using multiple masks. A further reduction can be obtained by using a single mask with the appropriate shaped opening dynamically calculated as a function of pilot head position, which opening would correspond to the instantaneous field of view, such as, e.g., area A in FIG. 7 or B in FIG. 8.

The effect of occulting determined according to this model is further illustrated in FIGS. 7 and 8. In FIG. 7, a field of view A of the overall symbology image 77 is generated and projected for the given placement of the eye 19 of the user. As seen in FIG. 8, when the eye is elevated slightly, a smaller, partly occulted field of view B is generated and projected for the pilot to see. through the beam splitter 18.

Similar occluding effects occur in left and right movement.

To put it another way, in a real vehicle the actual symbology produced by the HUD is collimated, vignetted and occulted by the optical and physical properties and limitations of the specific HUD design. As a consequence, depending upon the pilot's head position, the HUD optics may provide to the pilot only a limited viewable portion of the symbology, i.e., a subset of the total symbology. In order for the pilot to see more of the symbology, the pilot in an actual aircraft must move his head, and what is seen may be analogized to what is seen through a porthole. A move to the left will provide additional viewing of the symbology to the right, and visa versa. The same can be said for viewing up and down. Moving inward toward the HUD generally increases the amount of viewable symbology while moving away generally decreases the amount of viewable symbology.

The object(s), here mask(s), modeled by the symbology image generator 50B (FIG. 4) described in connection with FIG. 5, can take on any shape and can have feathered edges (levels of transparency going from opaque to transparent) as required. By creating a representation of the simulated HUDs physical pupils and optical limitations, the symbology image generator produces properly vignetted and occulted symbology. The mask(s) is modeled as appropriate to the capabilities of the image generator used (surface models, transparencies, texture patterns, etc.). If the pupil shape or size changes with pilot eye position, then multiple pupil masks are developed, retrieved and moved as moving objects as required during the generation of the HUD symbology imagery.

To complete the illusion for the pilot being trained in the simulator system 40, a non-optically functional HUD (i.e., the dummy HUD 60 and beamsplitter 18) are placed in the expected position in the cockpit to provide the pilot the physical "look and feel" of the HUD chassis and combiner structures.

The HUD symbology image itself is generated in the symbology image generator 50B and is projected onto the screen 48 with the OTW scene 44 as a real image for the pilot. The HUD symbology 46 includes the same symbology and information content as in an actual aircraft HUD, in the expected "green" monochrome/gray scale or full color as appropriate to the aircraft HUD being simulated, albeit occulted, if necessary, in accordance with the position and/or angular orientation of the pilot's head relative to the dummy HUD chassis 60.

To simulate a collimated OTW scene 44 and HUD symbology 46, the pilot's head position, and hence eye position, is actively determined using a standard head-tracking device placed on the pilot's head. The head location is then known in all six degrees of freedom relative to the cockpit. The determined eye position is then used to modify the OTW and symbology image generators, using determined window definitions and viewpoint location such that the displayed imagery remains correct in perspective to the pilot. With such conventional head tracking data, the OTW scene 44 and the HUD symbology 46 is moved proportionally to the eye positional data provided by the tracking system. For example, if the pilot moves his head to the left 1" and up 1", the visual scene, both the OTW scene 44 and the occulted symbology 46 of the screen 48 are also offset the same 1" to the left and up 1", producing the illusion of a collimated image (at infinity) for both OTW scene 44 and occulted symbology 46 on the screen 48.

Referring to FIG. 4, based on the head tracking data provided by the tracking system 50 relative to the HUD 60 for the vehicle being simulated, the actual field of view is calculated for the symbology in the symbology image generator 50B. Based on these calculations, the symbology 44 produced by the symbology image generator 50B is generated with any vignetting and occlusions required for the vehicle being simulated via the modeling of vignetting and occulting objects or masks. The vignetted and occulted symbology is thereby generated by the symbology image generator 50B, transmitted to the symbology projector 42B, and then projected onto the screen 48 superimposed with the OTW scene 46 from the OTW projector 42A.

The only symbology image projected is the viewable portion of the symbology that is expected to be seen by the pilot as his head moves, based on the relationship of the pilot's eye and the simulated vignetting and occulting object (s), here the mask(s) shown and described in connection with FIG. 5, is projected onto the screen by the symbology projector. Consequently, the pilot can then never look "around" the HUD beamsplitter and see the real image on the screen, because this would be outside the modeled viewing passage 73 and 75. This arrangement therefore provides to the pilot the illusion of a virtual image created by an actual HUD optical system, and not as an image projected onto the screen 48 (FIG. 4). The arrangement thus provides virtual vignetting in simulating a virtual image as viewed through the constrained size of the HUD magnifying optics using a real image as the source, i.e., the symbology, which may be occulted as a function of pilot position, projected onto the screen by the symbology projector.

Generally speaking, the optics of HUD systems may be either pupil-forming or non-pupil forming systems. It should be noted that the vignetting and occulting mask(s) used in the symbology image generator may be designed to provide the proper effects whether the optics of the HUD being simulated are pupil or non-pupil forming.

If the HUD type for the vehicle being simulated is pupil forming, then a further external pupil is created by the HUD optics and must be taken into account in the symbology image generator. In this case a dynamic vignetting/occulting mask, representing the external pupil, is modeled, in combination with other stationary masks as discussed above. This model simulates the mask dynamically, i.e., as being positioned and modified in response to the pilot eye position to get the desired vignetting and occulting effects. As long as the pilot keeps his eye within the external pupil, the HUD image is constrained only by the normal vignetting and occulting effects described above (i.e. the modeled mask associated with the external pupil is adjusted, aperture or cutout enlarged, to be non-interfering). However, if the pilot moves his eye outside the external pupil, the HUD image is completely blocked and the symbology image disappears (i.e. the mask associated with the external pupil is adjusted, aperture or cutout reduced, to totally block the symbology).

The terms used herein should be read as terms of description rather than of limitation, as those of skill in the art with this specification before them will be able to make modifications therein without departing from the spirit of the invention. Other embodiments beyond those here discussed are within the spirit and scope of the appended claims.

What is claimed is:

1. A vehicle simulator for a human user for simulating a real vehicle having an actual head-up display that displays real symbology and has optical characteristics that limit viewing of the real symbology from some points of view within the real vehicle, said simulator comprising:
    a tracking apparatus providing a time-dependent signal relatable to or representative of a position of an eye of the user;
    an image system forming a visual image viewable by the user, said image including a scene representing a simulated out-the-window view outside the vehicle and simulated head-up display symbology simulating the real symbology and superposed on said scene;
    said image system generating said simulated head-up display symbology using the signal provided by the tracking apparatus so that the simulated head-up display symbology displayed to the user is limited when the tracking apparatus signal indicates that the user is viewing the simulated head-up display symbology from a point of view wherein the optical characteristics of the actual head-up display in the real vehicle limit viewing of the real symbology thereof.

2. The simulator of claim 1, wherein the tracking apparatus includes an apparatus supported on the head of the user.

3. The simulator of claim 2 wherein the tracking apparatus includes magnetic sensors, sonic sensors, or optical sensors operatively associated with the apparatus, or mechanical coupling with the apparatus on the head of the user.

4. The simulator of claim 1 wherein the tracking apparatus generates a signal representing data including a position of the head of the user and an angular orientation thereof.

5. The simulator of claim 1 wherein said simulated head-up display symbology is projected on a projection screen.

6. The simulator of claim 5, wherein said image system includes a projector projecting said simulated head-up display symbology on the screen.

7. The simulator of claim 5 wherein said image system includes first and second projectors, said first projector projecting said out-the-window scene on the screen and the second projector projecting the simulated head-up display symbology on the screen.

8. The simulator of claim 1 wherein said simulator further comprises a dummy beamsplitting structure supported thereon, said simulated head-up display symbology being positioned on the screen so that said simulated head-up display symbology can be viewed by the user only through said dummy beamsplitting structure.

9. The simulator of claim 8 wherein said image system forms said simulated head-up display symbology in the image only where the user can see said simulated head-up display symbology through the dummy beamsplitting structure so that the user cannot see the simulated head-up display symbology without looking therethrough.

10. The simulator of claim 1 wherein said image generation system comprises a scene generation system and a simulated head-up display symbology generation system.

11. The simulator of claim 10 wherein said scene generation system and said simulated head-up display symbology generation system each comprise an independent processor receiving a signal derived from the tracking-apparatus signal.

12. The simulator of claim 10 wherein the image generation system further comprises a projection screen.

13. The simulator of claim 12 wherein
    said scene generation system is connected to a scene projector that projects the scene on the screen, and said simulated head-up display symbology generation system is connected with a simulated head-up display symbology projector projecting the simulated head-up display symbology on a smaller part of the screen.

14. The simulator of claim 1 wherein said image generation system simulates occulting of the simulated head-up display symbology in a real HUD display based on the tracking apparatus signal.

15. The simulator of claim 1 wherein said image generation system simulates vignetting of the real symbology in a real HUD display based on the tracking apparatus signal.

16. The simulator of claim 1 wherein tracking apparatus provides time-dependent data relatable to or representative of positions of two eyes of the user.

17. The simulator of claim 1 wherein said image system forms the visual image on an LCD display.

18. The simulator of claim 1 wherein said image system forms the visual image on a CRT display.

19. The simulator of claim 1 wherein
    said image system collimates the scene and symbology based on the signal provided by the tracking apparatus so that the simulated head-up display symbology and the scene stay in correct perspective with respect to movement of the head of the user.

20. The simulator of claim 19 wherein said collimating of the images is at infinity.

21. A vehicle simulator for a human user, said simulator comprising:
    a tracking apparatus for providing a time-dependent signal relatable to or representative of a position of an eye of the use;
    an image system projecting a visual image on a surface viewable by the user, said image including an out-the-window scene representing a simulated view outside the vehicle and a simulated head-up display symbology image superposed on said scene;
    said image system including
    first and second projectors, the first projector projecting the out-the-window scene onto the surface, and the second projector projecting the simulated head-up display symbology image onto the surface; and
    an image generation system connected with the projectors for generating the scene and simulated head-up display symbology image, said image generation system including a simulated head-up display symbology image generator;
    said simulated head-up display symbology image generator generating said simulated head-up display symbology image by first determining symbology for the scene and then modifying said symbology to produce the simulated head-up display symbology image based on the signal provided by the tracking apparatus so that the simulated head-up display symbology image simulates optical characteristics of an actual head-up display;

said simulated head-up display symbology image having a portion thereof occulted when the signal from the tracking apparatus indicates that the eye of the user is in a position in which the user would not see said portion of the simulated head-up display symbology image in the actual head up display in the vehicle being simulated.

22. The simulator of claim 21 wherein
the symbology image generator generates the simulated head-up display symbology image using a model of optical characteristics including a model of a mask having a passage aperture therein.

23. The simulator of claim 21 wherein
the symbology image generator generates the simulated head-up display symbology image using a model including a plurality of masks having apertures therein.

24. The simulator of claim 23 wherein
said model includes at least one dynamic mask has an aperture so that the simulated head-up display symbology image generator models a pupil forming HUD display.

25. The simulator of claim 21 wherein
said simulated head-up display symbology image generator generates the simulated head-up display symbology image so that the simulated head-up display symbology is collimated with objects in the scene.

26. The simulator of claim 21 wherein the simulator further comprises
a dummy beamsplitter structure through which the user can see a portion of the screen, said simulated head-up display symbology image being generated and projected based on the tracking apparatus signal so that the user cannot see the simulated head-up display symbology image around the beamsplitter structure.

27. A method of simulating a vehicle for a user, said method comprising:
determining a position of an eye of the user;
projecting on a simulator screen an out-the-window scene corresponding to a simulated situational environment of the vehicle;
deriving a simulated head-up display symbology image from the determination of the position of the eye of the user using a model of occulting or vignetting of an optical system of a HUD display for the vehicle so that a portion of said simulated head-up display symbology image is occulted when the determined position of the eye of the user is one in which said portion of the simulated head-up display symbology image would be occulted in a HUD display in the vehicle being simulated; and
projecting said simulated head-up display symbology image on said screen.

28. The method of claim 27 wherein said deriving of the symbology image includes determining an occluded simulated head-up display symbology image using a model of an optical system using at least one mask having a central aperture therein through which the user can see.

29. The method of claim 27 wherein
said projecting of the out-the-window scene and the simulated head-up display symbology images are performed by separate projectors.

30. The method of claim 27 wherein
said simulated head-up display symbology image and the out-the-window scene are collimated so that objects thereof move together responsive to movement of the head of the user.

31. The simulator of claim 1 wherein said actual head-up display in the vehicle being simulated is supported in a fixed position.

32. The simulator of claim 31 wherein said actual head-up display in the vehicle being simulated comprises a beamsplitter structure fixedly supported on the vehicle.

33. The simulator of claim 1 wherein said head-up display symbology is displayed on a display device that is supported fixedly in the simulator while the user's head can move relative thereto.

34. The simulator of claim 33 wherein said display device comprises a projection screen on which a projector projects the head-up display symbology.

35. The simulator of claim 34 wherein said out-the-window scene is also displayed by the projector on said projection screen.

* * * * *